(No Model.)  2 Sheets—Sheet 1.
A. W. VON SCHMIDT.
UNIVERSAL BALL JOINT.
No. 300,332.  Patented June 10, 1884.
Fig 2
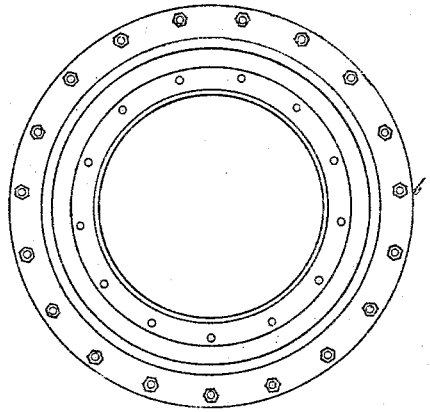
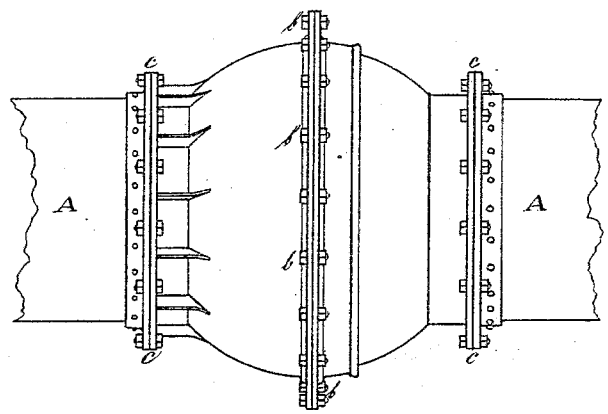
Fig 1
Witnesses:
Julius H. von Schmidt
William S. Doolittle
Inventor:
Allexey W. Von Schmidt (No Model.)  2 Sheets—Sheet 2.
A. W. VON SCHMIDT.
UNIVERSAL BALL JOINT.
No. 300,332. Patented June 10, 1884.
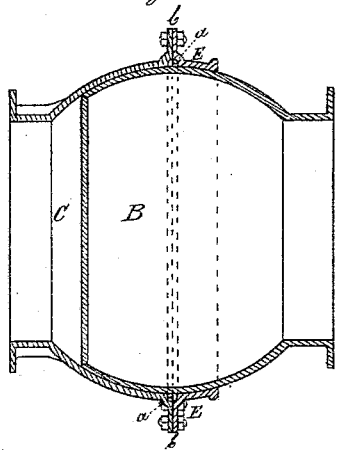
Fig. 3.
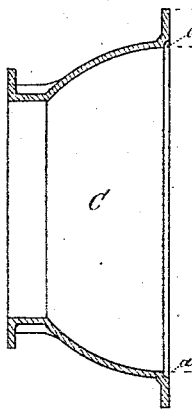
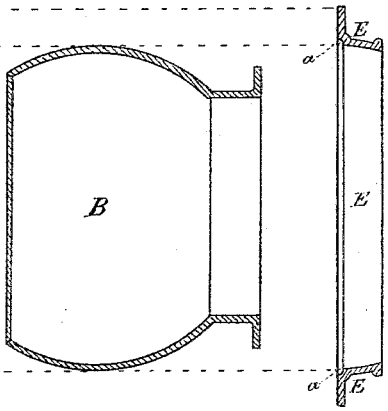
Fig. 6.  Fig. 4.  Fig. 5.
Witnesses:
Julius H. von Schmidt
William S. Doolittle
Inventor:
Alexey W. Von Schmidt

United States Patent Office.

ALLEXEY W. VON SCHMIDT, OF SAN FRANCISCO, CALIFORNIA.

UNIVERSAL BALL-JOINT.

SPECIFICATION forming part of Letters Patent No. 300,332, dated June 10, 1884.

Application filed November 19, 1883. (No model.)

*To all whom it may concern:*

Be it known that I, ALLEXEY W. VON SCHMIDT, of the city and county of San Francisco, and State of California, have invented a new and Improved Universal Ball-Joint for Steam, Water, or Air; and I do hereby declare that the following is a full, true, and exact description thereof, reference being had to the accompanying drawings, and to the letters of reference marked thereon, making a part of this specification.

My invention has for its objects the construction of a universal ball-joint to connect pipes one with the other, and permit the said pipes to form such angles as may be required on a stationary point, or when the pipes are afloat on ponton-boats, connecting with a dredging-machine and the shore, the peculiar construction and arrangements of the several parts to be hereinafter explained.

To enable those skilled to make and use my improved universal ball-joint, I will proceed to describe the construction and operation of the same, referring by letters to the accompanying drawings, in which—

Plate 1, Figure 1 represents a side view of universal ball-joint connected with conveying-pipes A. Plate 1, Fig. 2 represents an end view of same. Plate 2, Fig. 3 represents a longitudinal section of the universal ball-joint. Plate 2, Fig. 4 represents the center portion of universal ball-joint. Plate 2, Fig. 5 represents the packing-ring. Plate 2, Fig. 6 represents the outside portion of universal ball-joint with groove for packing. The universal ball-joint is formed of three metal pieces, as shown in Plate 2, Figs. 3, 4, 5, and 6, of which Fig. 4 letter B is the center part, and turned on the outside on a true curve. Fig. 6 better represents the outside shell, and turned on the inside, and to fit on the center piece, as shown in Fig. 3, letters B C E. Fig. 5, letter E represents the packing-ring, and is also turned on the inside to make a close fit, as shown in Plate 2, Fig. 3, letter E. Plate 2, Figs. 3, 5, and 6, letter *a* represents a half-round groove turned out of the outside portions of the universal ball-joint for the purpose of holding packing of either metal, hemp, or rubber.

When the several parts are ready for use, the packing having been inserted in the groove *a*, the flange or packing-ring is screwed fast to the outside portion of the ball-joint, as shown in Plates 1 and 2, Figs. 1, 2, and 3, letters *b*, when the joint is complete, after which the connection with the conveying-pipes A, Fig. 1, letter *c*, is made and ready for work.

My improved joint is intended particularly for use in connecting the ends of dredger-pipes which are supported upon ponton-boats and run from the dredging-machine to the shore. The preferred manner of securing the pipes to the joints is by providing the adjacent portions of each with upturned circumferential flanges, through which are passed bolts. When the position of the pipe is changed, the flange of the joint is liable to become bent or crushed, and thus the joint rendered defective. To obviate this difficulty I provide a series of ribs, *d*, between the flange and the rounded portion of the joint, so that any crushing strain, which, in the absence of the ribs, would be brought on the flange, is brought on the ribs.

What I claim as new, and desire to secure by Letters Patent, is—

The combination of the portion C, having a flange to which the pipe is joined by a similar flange, and the strengthening-ribs, for the purpose set forth, the portion B, adapted to enter the portion C, and the securing-ring E, the portion C and the ring E each having openings *a*, for the reception of a packing-ring, substantially as described.

ALLEXEY W. VON SCHMIDT.

Witnesses:
JULIUS H. VON SCHMIDT,
WILLIAM G. DOOLITTLE.